US012596827B1

(12) United States Patent
Delaney et al.

(10) Patent No.: US 12,596,827 B1
(45) Date of Patent: *Apr. 7, 2026

(54) SYSTEMS AND METHODS FOR PROVIDING ROLE-BASED ACCESS CONTROL TO WEB SERVICES USING MIRRORED, SECLUDED WEB INSTANCES

(71) Applicant: Cyber IP Holdings, LLC, Herndon, VA (US)

(72) Inventors: Christopher Edward Delaney, Front Royal, VA (US); Chava Louis Jurado, Leesburg, VA (US); Carl Bailey Jacobs, Fredericksburg, VA (US); Jeremiah MacDonald, Greenville, SC (US)

(73) Assignee: Cyber IP Holdings, LLC, Herndon, VA (US)

( * ) Notice: Subject to any disclaimer, the term of this patent is extended or adjusted under 35 U.S.C. 154(b) by 109 days.

This patent is subject to a terminal disclaimer.

(21) Appl. No.: 18/506,205

(22) Filed: Nov. 10, 2023

Related U.S. Application Data

(63) Continuation of application No. 17/190,550, filed on Mar. 3, 2021, now Pat. No. 11,853,443, which is a
(Continued)

(51) Int. Cl.
*G06F 21/62* (2013.01)
*G06F 21/31* (2013.01)
(Continued)

(52) U.S. Cl.
CPC .......... *G06F 21/6218* (2013.01); *G06F 21/31* (2013.01); *G06F 21/604* (2013.01);
(Continued)

(58) Field of Classification Search
CPC .... G06F 21/6218; G06F 21/31; G06F 21/604; H04L 67/51; H04L 67/55; H04L 67/568;
(Continued)

(56) References Cited

U.S. PATENT DOCUMENTS 6,112,228 A    8/2000  Earl et al.
8,893,294 B1  11/2014  Steele, III et al.
(Continued)

OTHER PUBLICATIONS

Wang, et al.; Random Domain Name and Address Mutation (RDAM) for Thwarting Reconnaissance Attacks; PLoS One, 12(5): e0177111; May 2017.

*Primary Examiner* — Oleg Korsak
(74) *Attorney, Agent, or Firm* — Jones Day

(57) ABSTRACT

Systems and methods are provided for providing access to data on a personalized basis. A service operating on a server is identified, where data at the service is associated with a first user and other users. Data associated with the first user is extracted. A network location is spawned for the first user. The extracted data is transferred to the spawned network location to make the extracted data available to the first user in a read-only fashion by accessing the spawned network location. Additional network locations are spawned for second and third users, respectively, wherein data associated with the second and third users is transferred such that they are available to the second and third users by accessing their respective additional network locations.

20 Claims, 4 Drawing Sheets

Related U.S. Application Data continuation of application No. 16/155,408, filed on Oct. 9, 2018, now Pat. No. 10,949,560.

(60) Provisional application No. 62/570,202, filed on Oct. 10, 2017.

(51) Int. Cl.

| | |
|---|---|
| *G06F 21/60* | (2013.01) |
| *H04L 9/40* | (2022.01) |
| *H04L 67/00* | (2022.01) |
| *H04L 67/51* | (2022.01) |
| *H04L 67/55* | (2022.01) |
| *H04L 67/568* | (2022.01) |

(52) U.S. Cl.
CPC .......... *H04L 63/083* (2013.01); *H04L 63/102* (2013.01); *H04L 63/108* (2013.01); *H04L 63/168* (2013.01); *H04L 67/34* (2013.01); *H04L 67/51* (2022.05); *H04L 67/55* (2022.05); *H04L 67/568* (2022.05)

(58) Field of Classification Search
CPC ... H04L 63/083; H04L 63/102; H04L 63/108; H04L 63/168; H04L 67/34
See application file for complete search history.

(56) References Cited

U.S. PATENT DOCUMENTS

| | | | | |
|---|---|---|---|---|
| 11,853,443 | B1 * | 12/2023 | Delaney | H04L 67/34 |
| 2002/0010798 | A1 | 1/2002 | Ben-Shaul et al. | |
| 2003/0120593 | A1 | 6/2003 | Bansal et al. | |
| 2003/0145094 | A1 | 7/2003 | Staamann et al. | |
| 2003/0188016 | A1 | 10/2003 | Agarwalla et al. | |
| 2003/0191812 | A1 | 10/2003 | Agarwalla et al. | |
| 2004/0049579 | A1 | 3/2004 | Ims et al. | |
| 2007/0106754 | A1 | 5/2007 | Moore | |
| 2008/0262990 | A1 | 10/2008 | Kapoor et al. | |
| 2009/0157693 | A1 | 6/2009 | Palahnuk | |
| 2010/0037298 | A1 | 2/2010 | Lottin et al. | |
| 2012/0124372 | A1 * | 5/2012 | Dilley | H04L 67/564 |
| | | | | 713/162 |
| 2013/0031203 | A1 | 1/2013 | Bestfleisch et al. | |
| 2013/0291060 | A1 | 10/2013 | Moore | |
| 2013/0325671 | A1 * | 12/2013 | Glass | G06Q 20/387 |
| | | | | 705/27.1 |
| 2013/0326020 | A1 * | 12/2013 | Bastide | H04L 51/52 |
| | | | | 709/218 |
| 2016/0004820 | A1 | 1/2016 | Moore | |
| 2016/0191296 | A1 | 6/2016 | Scharber et al. | |
| 2016/0197886 | A1 * | 7/2016 | Lapidous | H04L 67/02 |
| | | | | 713/168 |
| 2017/0149767 | A1 | 5/2017 | Hinton et al. | |
| 2020/0137189 | A1 | 4/2020 | Steele, III et al. | |

* cited by examiner

CONTAINS DATA ASSOCIATED WITH USER A AND USER B

USER A AND USER B ARE PERMITTED ACCESS

E.G. MESSAGE SERVICE, EMAIL SERVICE, DATABASE SERVICE

102

104

SERVICE

108

SERVICE DATA

110

SERVER

106

USER A

106

USER B

106

USER C

SYSTEMS AND METHODS FOR PROVIDING ROLE-BASED ACCESS CONTROL TO WEB SERVICES USING MIRRORED, SECLUDED WEB INSTANCES

CROSS-REFERENCE TO RELATED APPLICATIONS

This application is a continuation application of U.S. application Ser. No. 17/190,550, filed Mar. 3, 2021, which is a continuation application of U.S. application Ser. No. 16/155,408 filed Oct. 9, 2018, which claims priority to U.S. Provisional Application No. 62/570,202, filed Oct. 10, 2017, all of which are incorporated herein by reference in their entireties.

TECHNICAL FIELD

The technology described herein relates data communications and more particularly to control of data access through the use of secluded web instances.

BACKGROUND

Web services having interfaces that are known and accessible to multiple users are prone to abuse and attack. Disseminated knowledge of the location of the interface (e.g., an address) provides a gateway for unauthorized access attempts. Centralized storage of service data associated with multiple users (e.g., the users who are permitted to access the service) provides opportunities for abuse even by authorized users. For example, authorized users can access the service interface using their credentials and then can attempt to access service data to which they are not entitled (e.g., service data associated with other users) after entry to the system via their credentials.

SUMMARY

Systems and methods are provided for providing access to data on a personalized basis. A service operating on a server is identified, where data at the service is associated with a first user and other users. Data associated with the first user is extracted. A network location is spawned for the first user. The extracted data is transferred to the spawned network location to make the extracted data available to the first user in a read-only fashion by accessing the spawned network location. Additional network locations are spawned for second and third users, respectively, wherein data associated with the second and third users is transferred such that they are available to the second and third users by accessing their respective additional network locations.

As another example, a system for providing access to data on a personalized basis includes one or more data processors and a computer-readable medium encoded with instructions for commanding the processing system to execute steps of a method. In the method, a service operating on a server is identified, where data at the service is associated with a first user and other users. Data associated with the first user is extracted. A network location is spawned for the first user. The extracted data is transferred to the spawned network location to make the extracted data available to the first user in a read-only fashion by accessing the spawned network location. Additional network locations are spawned for second and third users, respectively, wherein data associated with the second and third users is transferred such that they are available to the second and third users by accessing their respective additional network locations.

As a further example, a computer-readable medium is encoded with instructions for commanding one or more data processors to execute a method for providing access to data on a personalized basis. In the method, a service operating on a server is identified, where data at the service is associated with a first user and other users. Data associated with the first user is extracted. A network location is spawned for the first user. The extracted data is transferred to the spawned network location to make the extracted data available to the first user in a read-only fashion by accessing the spawned network location. Additional network locations are spawned for second and third users, respectively, wherein data associated with the second and third users is transferred such that they are available to the second and third users by accessing their respective additional network locations.

DETAILED DESCRIPTION

Figure 1:
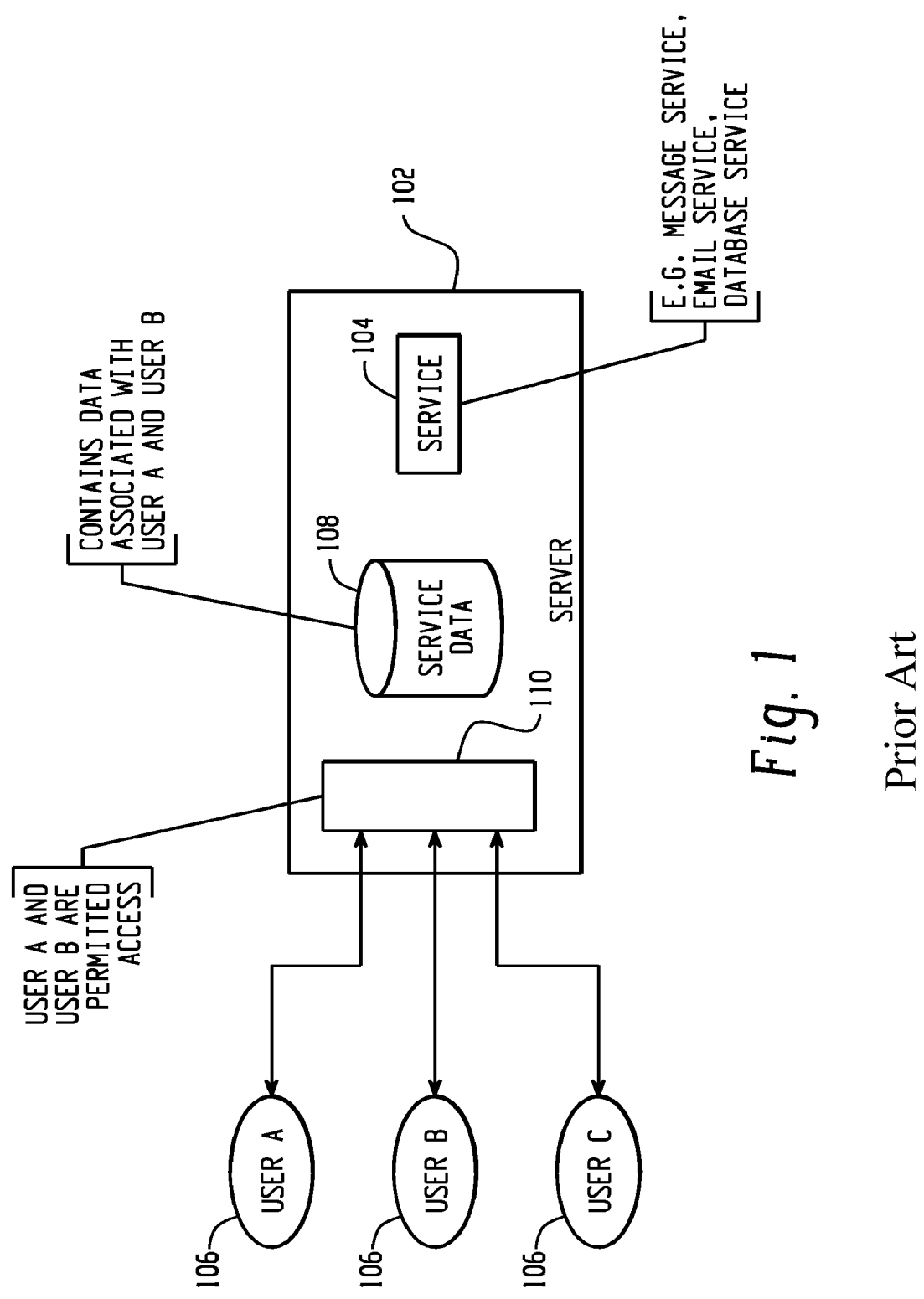
FIG. 1 is a block diagram depicting a server that provides a web service accessible by multiple users.

FIG. 1 is a block diagram depicting a server that provides a web service accessible by multiple users. The server 102 (e.g., one or more servers) includes a web service 104 executing thereon. The web service 104 aggregates, calculates, generates, or otherwise acquires data associated with one or more users 106 and stores that data in a service data repository 108 for access by the users 106. Web service 104 can take a wide variety of forms including a messaging service (e.g., email, SMS), a chat service, a database service. The server 102 includes an interface 110 via which users 106 access the service 104 and the associated service data 108. The interface 110 is tasked with authenticating users 106 to determine whether that user has permission to access the service 104 and the service data 108. For example, the interface 110 may challenge an accessing user 106 to provide credentials (e.g., a username/password combination, a token, a key) that verifies the user's identity and permission to access service 104 functionality and data 108. Once authenticated, the interface 110, the service 104, or other controls mediate which service 104 functionality and data 108 an authenticated user 106 is permitted to access.

Figure 2:
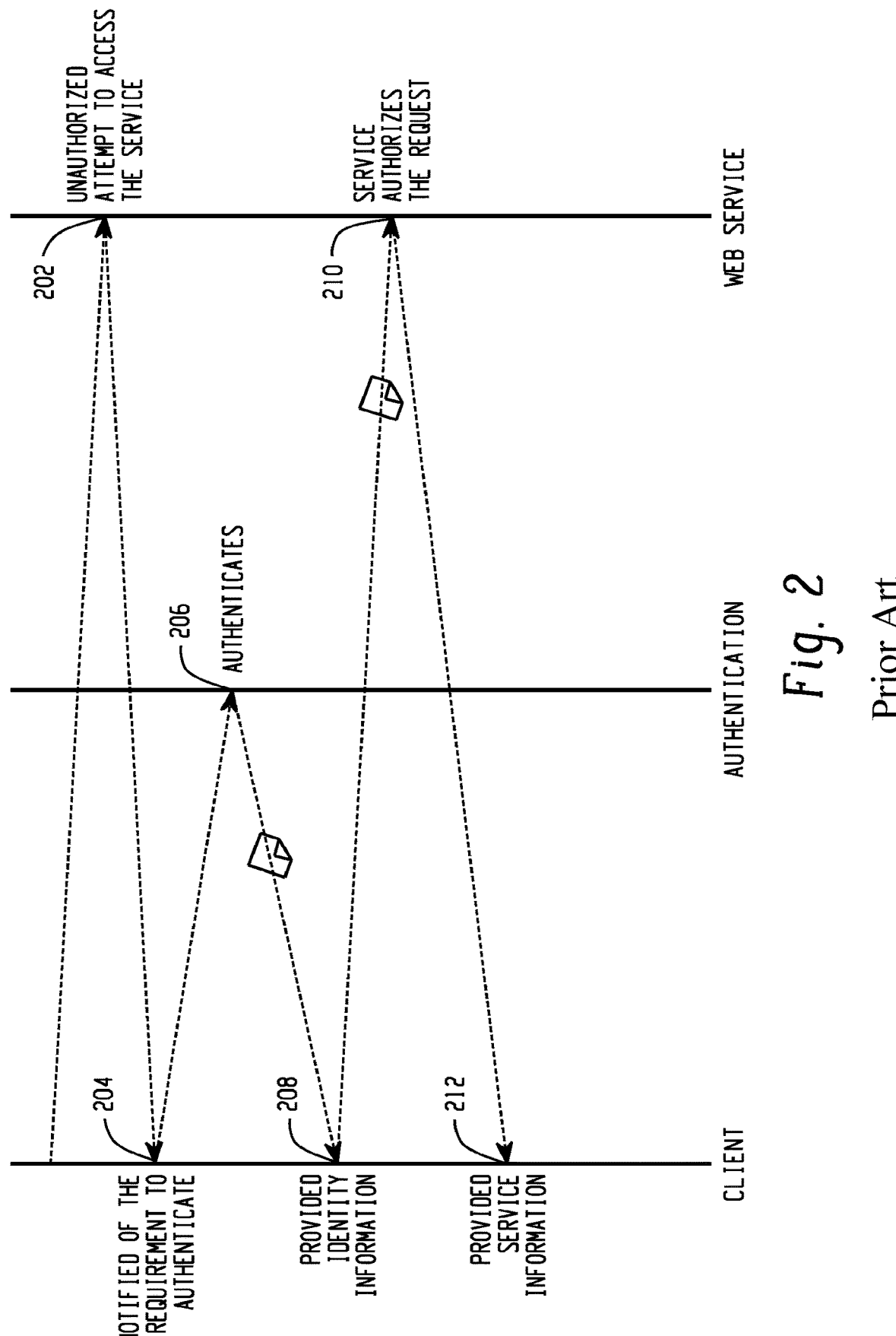
FIG. 2 is a diagram depicting an example authentication sequence for accessing a server that provides access to a server and associated service data.

In the example of FIG. 1, service 104 has acquired data associated with User A and User B in the service data repository 108. Accordingly, the interface 110 is informed that User A and User B are to be permitted access upon presentation of proper credentials. User C is not to be permitted access by the interface 110. FIG. 2 is a diagram depicting an example authentication sequence for accessing a server that provides access to a server and associated service data. A user 106 (e.g. User A) at 202 attempts to access the service 104 directly. The user 106 is informed by the interface 110 at 204 of a requirement to authenticate. The user 106 presents credentials to the interface 110 at 206 and is presented confirmed identity information at 208. The user 106 uses that identity information to again request access to the service at 210, and based on the identity information, the user 106 is provided service information at 212.

The configuration of FIGS. 1 and 2 is vulnerable to attack and abuse in at least two ways. First, the location (e.g., address) of one or more of the server 102, the service 104, or the interface 110 is known to multiple people. This wide dissemination of location information provides a greater likelihood that the location information will be misappropriated by others. For example, User C, who has no rights to access service 104 or its associated service data 108, could acquire the location information surreptitiously from User A or User B or with their assistance. Knowing the location information, User C could then attempt to access the service 104 or service data repository 108 (e.g., via a hack, using User A or User B's credentials) to access data to which User C is not entitled.

In a second example, an authorized user (User A) could use their legitimate credentials to access the service 104 and service data 108. Once through the interface 110, certain systems' internal security is not as robust as that of the interface 110. After authentication, the authorized user could attempt to access service data 108 to which they are not entitled (e.g., User A accessing messages of User B) by improperly upgrading their access permissions or taking advantage of another security flaw. Housing service data 108 of users (e.g., User B) in a location that will be accessed by other users (e.g., User A) provides another potential security weakness.

Figure 3:
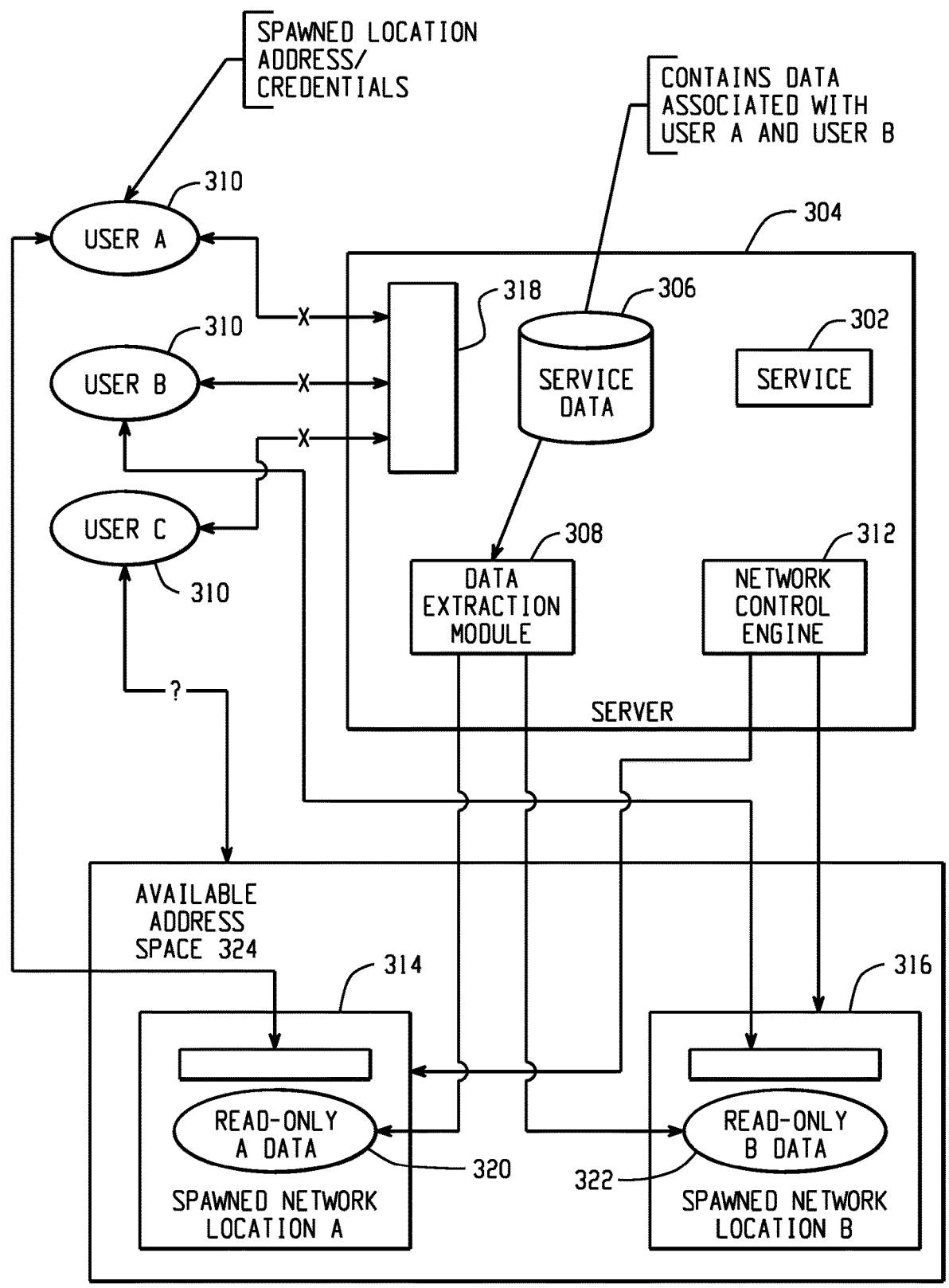
FIG. 3 is a block diagram depicting a system for providing access to data on a personalized basis.

FIG. 3 is a block diagram depicting a system for providing access to data on a personalized basis. The system includes a service 302 operating on a server 304. Data associated with the service 302 is stored as service data in a service data repository 306. But, no user 310 is permitted to access service data 306 directly via an interface 318 of the service 302/server 304. This is indicated by the "X" on the lines connecting the users 310 to the interface 318. In fact, it is preferable that no user be provided the location (e.g., address) of the server 304, service 302, or interface 318 to prevent any attempt at access. Instead, each user 310 (or group of users) is provided access to a network location (e.g., a physical server location, a virtual server location) that is separate from the service 302 and contains only service data 306 that that user is permitted to access.

Specifically, in one example, a data extraction module 308 is configured to extract data associated with users 310, such as User A and User B. A network control engine 312 is configured to spawn network locations 314, 316 for users who are to be provided access to service data 306 (i.e., one spawned network location A 314 for User A and one spawned network location B 316 User B). The spawned network locations 314, 316 may be spawned at a random or pseudo-random address in an available address space 324 that the network control engine 312 controls. That address space 324 may be substantial in size in order to help protect the spawned network locations 314, 316 from detection. In one embodiment, spawned network locations 314, 316 may be kept operational for a limited period of time (e.g., a threshold period of time, a random or pseudo-random period of time), after which a replacement spawned network location may be provisioned at a new address in the address space 324 and its predecessor disabled.

The data extraction module 308 is configured to transfer the extracted service data for a particular user (e.g., the data associated with User A) to the spawned network location associated with that particular user (e.g., spawned network location A 314), such as via a reverse proxy connection. The data extraction module 308 is further configured to transfer the extracted service data for other users 310 (e.g., the data associated with User B) to respective spawned network locations (e.g., spawned network location B 316). Thus, one spawned network location 314, 316 is provided to hold service data (e.g., a read only copy of User A's service data 320 from repository 306 is stored on spawned network location A 314) that a particular user is permitted to access but no more. In one embodiment, the data extraction module periodically (e.g., after a pre-determined period of time, upon a user command, on occurrence of an event) determines whether the service data 306 of a user (e.g., User B) has changed. If that service data 306 has changed, the data extraction module 308 transmits updated data to the repository (e.g., data store 322 for User B) stored on that user's spawned network location.

Location data for accessing interfaces of spawned network locations is then provided on a user by user basis via an out of channel communication (e.g., a link embedded in an email or a text message). The location data may be accompanied with credential information (e.g., an embedded password or token), or a user's existing credentials may be used to access the noted location. Should a user's spawned network location's address change (e.g., as may be periodically done in order to obfuscate locations of such spawned network locations), an updated location may be sent to that user via another out of channel communication.

The above-described network configuration mitigates the two security weaknesses described above with respect to FIGS. 1 and 2. First, because no user 310 is provided locations of the service 302, server 304, or the interface 318, attacks on those entities become more difficult. Where, in the example of FIGS. 1 and 2, User C could have misappropriated such locations from User A or User B, that behavior is not possible in the FIG. 3 implementation because User A and User B preferably do not have or need the location of those entities. Further, authorized users accessing their spawned network location are not able to access more service data 306 than they are entitled. Because User A's spawned network location A 314 only contains User A's service data at 320, User A is not able to access User B or any other user's data because no other user's service data is stored at spawned network location A.

Malicious behavior by unauthorized User C is also substantially mitigated. User C has no knowledge of the locations of the spawned network locations 314, 316. And in implementations where spawned network locations are periodically moved, even if User C did discover a spawned network location's address, that address would change after a period of time (e.g., minutes, hours, days), halting access. Further, even if User C was able to break into a spawned network location (e.g., spawned network location A 314), User C would only be able to access data associated with a single user because only a single user's service data (e.g., User A's data at 320) is stored at a spawned network location.

Figure 4:
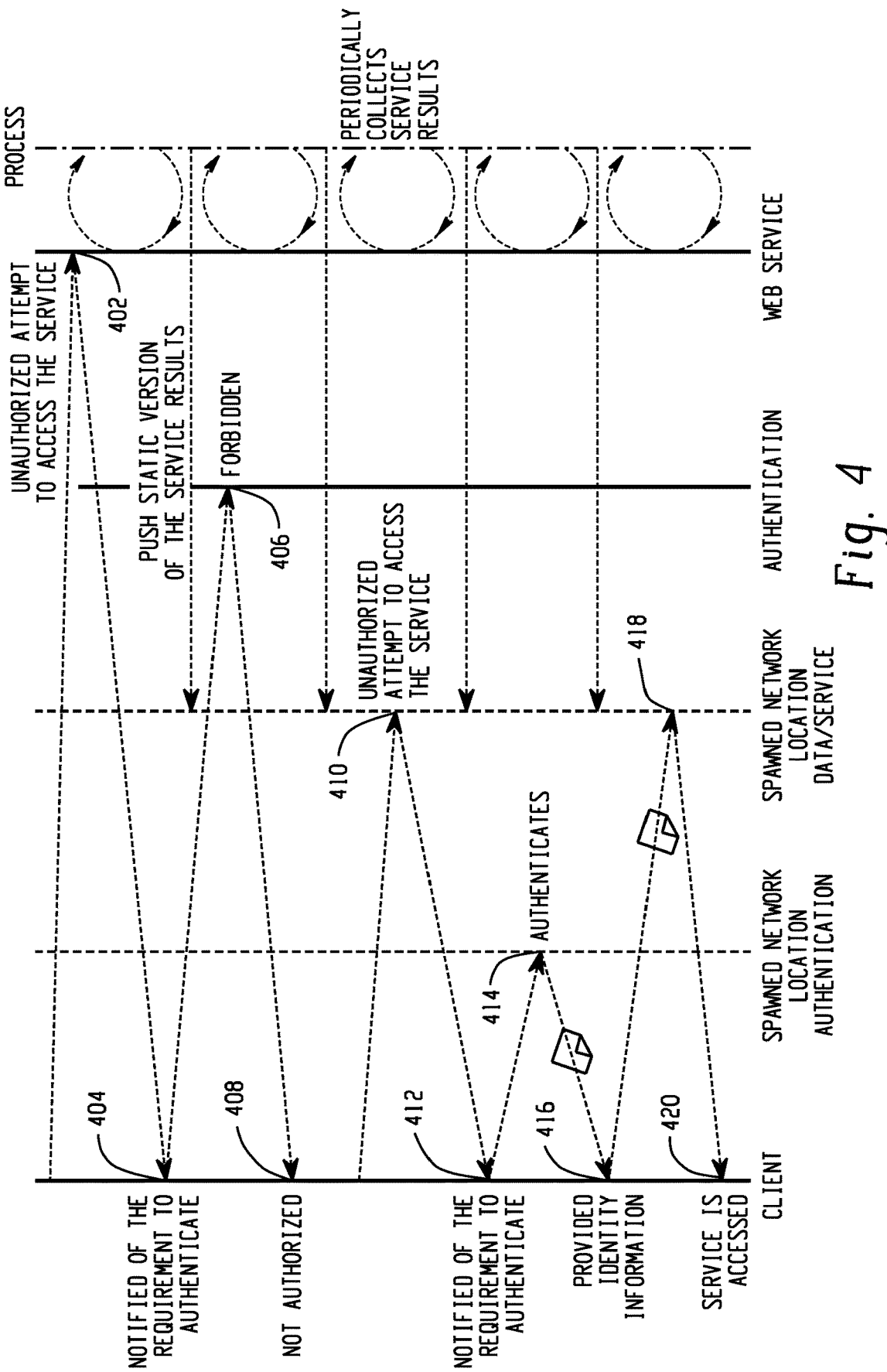
FIG. 4 is a diagram depicting an example authentication sequence for accessing a system for providing access to data on a personalized basis.

FIG. 4 is a diagram depicting an example authentication sequence for accessing a system for providing access to data on a personalized basis. A web service 302 operates on a server 304, and a process periodically operates to collect updates to the service data 306. That service data 306 is transmitted to an isolated server (e.g., 314, 316) associated with a particular user as described above. A user (e.g., User A) tries unsuccessfully and then successfully to access his data as follows. At 402, the user attempts to directly access the web service 302. Because some persons, such as a system administrator, may be able to access the web service 302 in this manner, a message is returned at 404 requesting authentication. (In some embodiments, it is preferred that User A not know the location of the web service 302 at all.) The user attempts to authenticate using his credentials (e.g., his work network username and password) at 406. Because User A is not permitted to access the web service 302 directly, an unauthorized indication is returned at 408.

At 410, User A attempts to access his spawned network location (e.g., using a link sent directly to User A only via a text or email message). At 412, User A is informed that he must authenticate. At 414, User A presents his correct credentials, and at 416 identity information is provided to User A's client system. At 418, User A uses that identity information to request data from the spawned network location, and at 420, User A's service data 306 is returned to User A's client.

While the disclosure has been described in detail and with reference to specific embodiments thereof, it will be apparent to one skilled in the art that various changes and modifications can be made therein without departing from the spirit and scope of the embodiments. Thus, it is intended that the present disclosure cover the modifications and variations of this disclosure provided they come within the scope of the appended claims and their equivalents.

It is claimed:

1. A method for providing access to data, comprising:
   identifying, for each of a plurality of users, respective data that is stored on a server that is inaccessible to any of the plurality of users;
   spawning a network location for each user;
   transferring, for each user, the corresponding data to the respective spawned network location; and
   providing, for each user, access to the corresponding transferred data using the respective spawned network location.

2. The method of claim 1, further comprising:
   detecting an update of the data associated with a first user of the plurality of users; and
   pushing updated data associated with the first user to the spawned network location for access by the first user.

3. The method of claim 1, further comprising:
   receiving a direct access request by a first user of the plurality of users attempting to access a service of the server directly; and
   providing an indication to the first user that authentication is required to directly access the service.

4. The method of claim 3, further comprising:
   receiving an authentication attempt by the first user at the server; and
   providing an indication to the first user that the first user is not authorized to directly access the service.

5. The method of claim 1, further comprising:
   receiving an attempt by a first user of the plurality of users to access the spawned network location; and
   providing an indication to the first user that authentication is required to access the spawned network location.

6. The method of claim 5, further comprising:
   receiving an authentication attempt by the first user at the spawned network location; and
   permitting the first user to access the transferred data from the spawned network location.

7. The method of claim 1, wherein a first user of the plurality of users is a single user or a group of users.

8. The method of claim 1, wherein a service of the server is a message service, wherein messages for a first user of the plurality of users are extracted and transferred to the spawned network location for access by the first user.

9. The method of claim 1, wherein the spawned network location for a first user of the plurality of users is maintained for a random or pseudo-random period of time and then is terminated.

10. The method of claim 9, wherein, following termination of the spawned network location for the first user, a second network location is spawned for the first user, wherein the data associated with the first user is transferred to the second network location for access by the first user.

11. The method of claim 1, wherein authentication credentials and an address for the spawned network location are provided to a first user of the plurality of users via a digital message.

12. The method of claim 11, wherein the digital message is an electronic mail or a text message.

13. The method of claim 11, wherein the address and the authentication credentials are embedded in a link contained in the digital message.

14. The method of claim 1, wherein all data transferred to the spawned network location for a first user of the plurality of users is associated with the first user.

15. The method of claim 14, wherein no data that is not associated with the first user is transferred to the spawned network location.

16. The method of claim 1, further comprising:
   directly accessing a service of the server by a system administrator authorized to directly access the service.

17. The method of claim 1, wherein the server connects to the spawned network location for a first user of the plurality of users via a reverse proxy connection to transfer the data associated with the first user.

18. The method of claim 1 further comprising:
   identifying a service operating on the server as being associated with the plurality of users.

19. A non-transitory computer-readable medium encoded with instructions for commanding one or more data processors to execute steps of a method for providing access to data, the steps comprising:
   identifying, for each of a plurality of users, respective data that is stored on a server that is inaccessible to any of the plurality of users;
   spawning a network location for each user;
   transferring, for each user, the corresponding data to the respective spawned network location; and
   providing, for each user, access to the corresponding transferred data using the respective spawned network location.

20. A system for providing access to data, comprising:
   at least one processor; and
   memory storing instructions which, when executed by the at least one processor, execute operations comprising:
   identifying, for each of a plurality of users, respective data that is stored on a server that is inaccessible to any of the plurality of users;
   spawning a network location for each user;
   transferring, for each user, the corresponding data to the respective spawned network location; and
   providing, for each user, access to the corresponding transferred data using the respective spawned network location.

* * * * *